Feb. 27, 1968     A. COX ETAL     3,370,907
POWER OPERATED ZOOM AND FOCUS CONTROL WITH
SELECTIVE OPTICAL PATHS TO VIEWFINDER Filed Feb. 4, 1965     5 Sheets-Sheet 1

Fig. 1.

Inventors:
Arthur Cox
Henry J. Koeber, Jr.
Stephen Liszczak.
By Barry L. Clark
John E. Peele Jr    Attys Feb. 27, 1968 A. COX ET AL 3,370,907
POWER OPERATED ZOOM AND FOCUS CONTROL WITH
SELECTIVE OPTICAL PATHS TO VIEWFINDER
Filed Feb. 4, 1965 5 Sheets-Sheet 3

Inventors:
Arthur Cox
Henry J. Koeber, Jr.
Stephen Lisaczak.
By Barry L. Clark
John E. Peele Jr. Attys

United States Patent Office 3,370,907
Patented Feb. 27, 1968

3,370,907
POWER OPERATED ZOOM AND FOCUS CONTROL WITH SELECTIVE OPTICAL PATHS TO VIEWFINDER
Arthur Cox, Park Ridge, Henry J. Koeber, Jr., Deerfield, and Stephen Liszczak, Wood Dale, Ill., assignors to Bell & Howell Company, Chicago, Ill., a corporation of Illinois
Filed Feb. 4, 1965, Ser. No. 430,384
25 Claims. (Cl. 352—140)

ABSTRACT OF THE DISCLOSURE

A power drive means selectively operable to adjust the focus or focal length of a main objective of a camera having in addition to the focusable variable focal length main objective, a focusing auxiliary viewing objective, and a viewfinder. The optical paths of the objectives are optically connectable by a control on the camera which selectively positions a reflecting surface so that when the field of view to be photographed is to be determined, the main objective optical path is optically connected to the viewfinder; and when the main objective is to be focused, the auxiliary objective optical path is optically connected to the viewfinder. The focusing action of the auxiliary objective simultaneously focuses the main objective. The control simultaneously shifts the drive of the power means to selectively adjust either the focus or zoom optics of the main objective as the reflecting surface is selectively oriented. By circuitry including the camera's governor which may permit the film drive of the camera to operate at dual speeds, the speed of the objective drive motor is similarly coordinated.

---

Photographic cameras having zoom lenses operated by a power drive mechanism throughout the zooming range are available on the market today. Manual focusing of such zoom lenses, usually by movement of the front portion, has also been available for some time. However, there are no zoom lens cameras available which employ a power drive mechanism for operating either the lens throughout its zooming range or focusing such lens.

The present invention relates to zoom lenses and more particularly to a control device which power drives the zoom lens in either direction throughout its adjustment range, this same power drive being selectively usable for focusing the front element of the zoom lens on a finite object when it is necessary or desired. It further relates to an optical arrangement whereby, selectively in the same viewfinder, either an image from the photographic lens or a highly magnified portion of such image from a high powered magnifier can be observed.

A complete understanding of our invention may be obtained from the following detailed description when read in conjunction with the appended drawings, in which.

Referring to the drawings, a camera, generally designated at 10, comprises a front housing 11 in which essentially all of the optical components and the mechanical adjustment mechanisms therefor, involved in the present invention, are mounted. The camera 10 also comprises a rear housing 12 in which the film moving mechanism, film supply, viewfinder tube, power source (battery) and operating buttons for the lens adjustment mechanisms are contained.

A zoom lens, generally designated at 15, has an annular sleeve 16 which is located in a shouldered bore 17 in housing 11 and fastened to the housing by means of screws 18. Lens 15 is a focal and operates in conjunction with a prime lens, generally designated at 19, to form an image of a scene on a film 21 located at a focal plane 22.

Rotatably mounted on sleeve 16 is a gear 23 which is connected to adjusting cams which adjust the zoom lens throughout its magnification range. Also rotatably mounted on sleeve 16 is another gear 24 which is connected to a focusing ring 26 by means of a driving pin 27 to adjust a front lens cell 28 for focusing of the zoom lens 15. The adjusting cams and the focusing means within the focusable zoom lens 15 are not further described as they form no part of the present invention.

Below and to one side of the zoom lens 15 there is a bore 29 in which a lens barrel 31 containing an auxiliary high magnification objective, generally designated at 32, is slidably mounted, such objective being used for focusing purposes. This objective has a long focal length along with a very shallow depth of field, thus making it relatively easy to obtain critical focusing of an object. The focal length of the high magnification auxiliary objective 32 is preferably selected to be greater than the maximum focal length to which the focusable, zoom main lens can be adjusted. Thus, because of the auxiliary objective's shallower depth of field, when it is correctly focused, the main objective, which is adjusted therewith, will be focused as well. Mounted externally on barrel 31 of the auxiliary objective is a threaded screw 33, the head of which enters a spiral adjusting cam 34 formed in the outer wall of the focusing ring 26 so that the focusing objective 32 and the front lens cell 28 are adjusted in unison to focus on the same finite object. A keyway 36 is formed in the outer surface of barrel 31 and cooperates with a pin 37 mounted in housing 11 to prevent rotation of barrel 31 during its sliding movement.

On the rear of housing 11 in the vicinity of bore 29 there is a cast angular support 38 upon which a mirror 39 is cemented. This mirror reflects an image entering the objective 32 in an upward direction toward a rotatable second mirror 41 mounted for movement about the optical axis of a viewfinder tube generally designated at 42.

Also at the rear of housing 11 there is a support plate 43 mounted to the housing by means of screws 44. This plate serves as the mounting plate for the zoom and focus power drive mechanism as well as the rotatable mirror 41. Riveted to the plate 43 is a flanged bushing 46 in which a shouldered shaft 47 rotates, such shaft being part of an angular support member 48 on which mirror 41 is cemented. At the end of shaft 47 there is a cup shaped member 49 having a notch 51, such member being fastened to the end of shaft 47 by means of a screw 52. Surrounding flanged bushing 46 and between the bushing and the cup-shaped member 49 is a combination compression and torsion spring 53. One end of spring 53 is located in notch 51 while the other end is located in a notch 54 in bushing 46. This spring serves to keep the shouldered shaft 47 against the face of bushing member 46 and also supplied spring torque to shaft 47 in a counter-clockwise direction as viewed in FIG. 1.

Mounted in an arm 56 extending rearwardly from housing 11 is a vertical support member 57 which supports, at its upper end, an angular mirror 58 so positioned as to reflect an image from the photographic lens axis substantially 90 degrees from that axis. Between this angular mirror and the rotatable mirror 41 is a viewfinder objective generally designated as 59 mounted on a bracket 61 which in turn is mounted to plate 43 by means of screws 62.

Angular support member 48 has a flange portion 63 having substantially radial surfaces 64 and 66 adapted to cooperate with a stop pin 67 riveted to plate 43. When the surface 64 is against stop pin 67 the rotatable mirror 41 is optically aligned with the viewfinder objective 59 and the angular mirror 58 to bring to the viewfinder eyepiece an image from the photographic lens axis. When the surface 66 is in contact with the stop pin 67 the rotatable mirror 41 is optically aligned with the mirror 39 to bring to the viewfinder eyepiece a highly magnified image from the objective 32.

In the top end of plate 43 there is a bent up ear 68 perpendicular thereto on the end of which a formed lever 69 is mounted for pivotal movement on pivot 71. At its opposite end, lever 69 has a hole 72 through which one end of a cord 73 passes from where it wraps around and under a clamping screw 74. Cord 73 passes around an annularly grooved support member 76 affixed to plate 43 and thence around a combination annularly grooved support and stud member 77 from where the cord passes around the angular support member 48, through a hole 78 in flange 63. A knot is then tied in this end of cord 73 to prevent it from slipping through hole 78.

Figure 1:
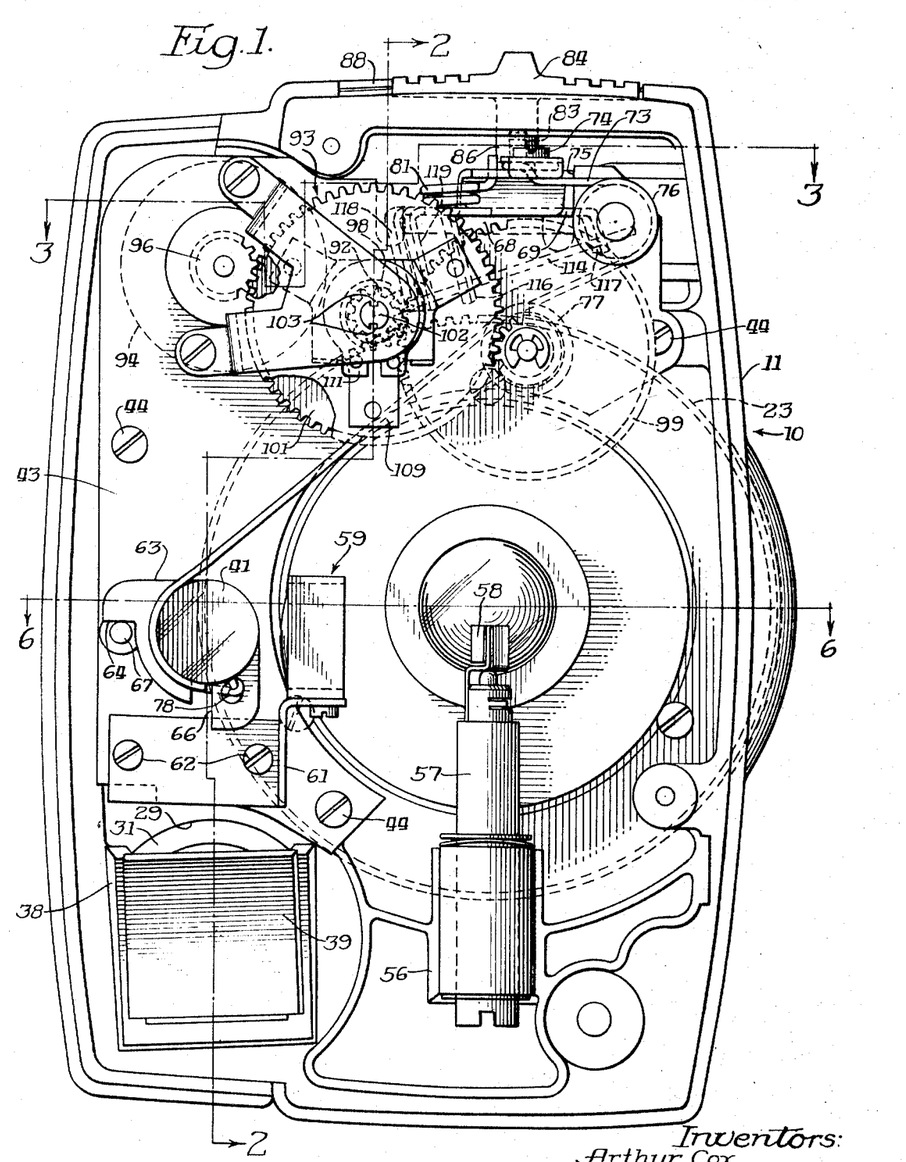
FIG. 1 is a rear elevation view of the front housing of a camera embodying the principles of the present invention.
Figure 2:
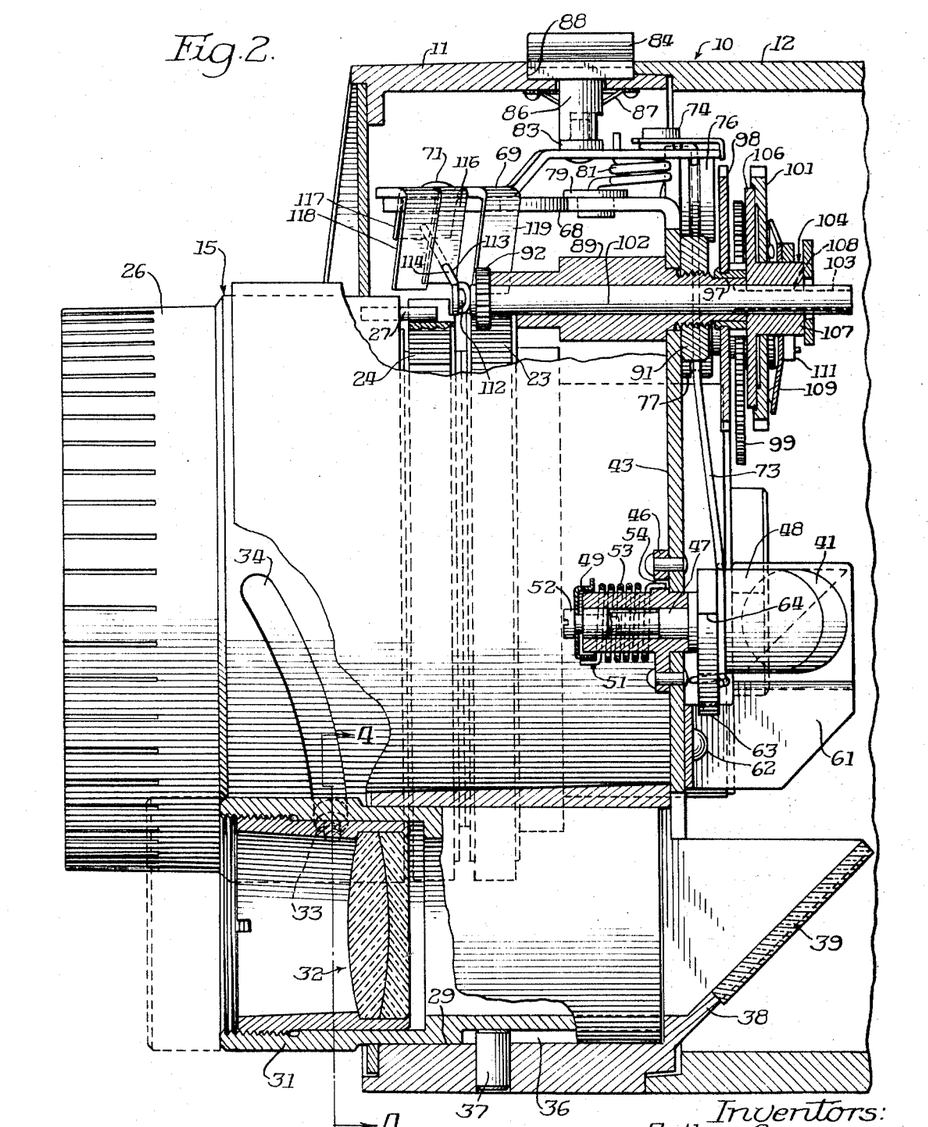
FIG. 2 is a vertical sectional view taken on the line 2—2 of FIG. 1.
Figure 3:
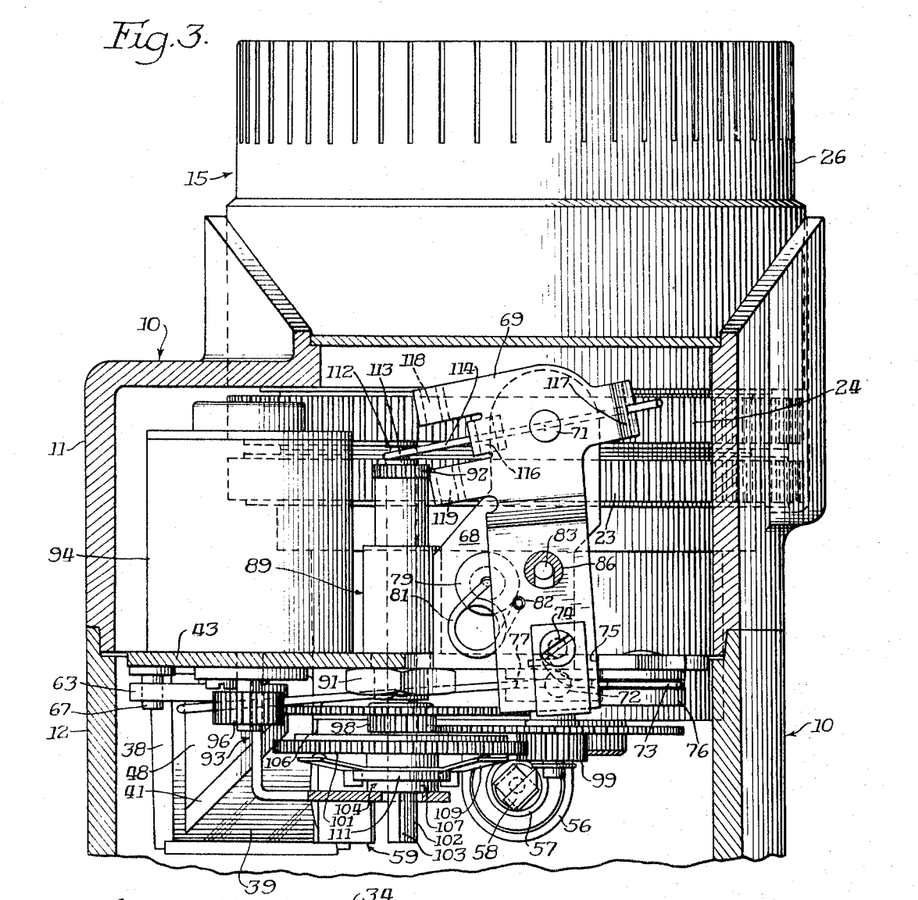
FIG. 3 is a horizontal sectional view taken on the line 3—3 of FIG. 1.
Figure 4:
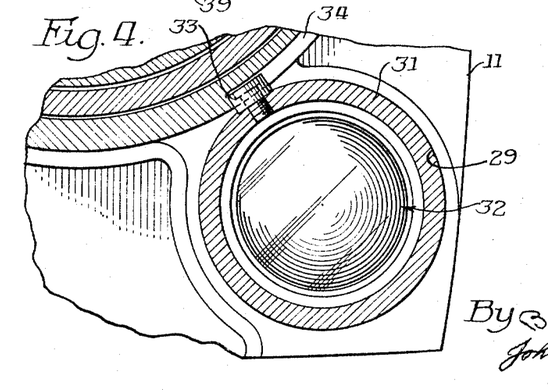
FIG. 4 is a vertical sectional view taken on the line 4—4 of FIG. 2.

A flanged bushing 79 is press fitted into a hole in bent up ear 68 and serves to mount one end of an over center spring 81 with the other end of the spring mounted in a hole 82 in the formed lever 69. A shouldered stud 83 is riveted to formed lever 69 and forms part of a connection between the lever and a sliding control member 84 by entering a U-shaped slot in a hub extension 86 of the control member. The hub extension 86 is also utilized for mounting of a fastening device 87 thereon to slidably mount the control member in a recess 88 of the housing 11. It is to be noted that movement of the sliding control member 84, through over center spring 81, angularly swings formed member 69 about its pivot 71. Movement of control member 84 to the focus position (to the left as viewed in FIG. 1) rotates mirror 41 through cord 73, against torsion spring 53, until surface 66 is in contact with stop pin 67. In this position there is still spring tension on cord 73 from over center spring 81 which keeps the cord taut and thus assures continued contact of surface 66 with stop pin 67. When control lever 84 is moved to the zoom position as shown in FIG. 1, torsion spring 53 rotates mirror 41 until surface 64 is in contact with stop pin 67. In this position, cord 73 is not taut and to prevent undesirable looseness of the cord, there is a stop 75 formed as part of plate 43 which stops movement of formed lever 69 to which cord 73 is attached.

An externally threaded bushing member indicated generally at 89 is mounted to plate 43 by a nut 91 and serves as the rotatable support member for a driven pinion 92 which is the output gear of a power driven speed reducing gear transmission indicated generally at 93. Mounted to plate 43 is a reversible D-C motor 94 with a pinion 96 affixed to its shaft. Freely rotatable on a reduced portion 97 of bushing member 89 is a compound gear 98, the larger gear of which meshes with the pinion 96 while the smaller gear meshes with the larger gear of another compound gear 99 which is freely rotatable on the combination annularly grooved support and stud member 77. The smaller gear of the compound gear 99 meshes with a gear 101.

Pinion 92 is part of a shaft 102 which is rotatably and slidably mounted in bushing 89. At one end of the shaft 102, away from pinion 92, there are keyways 103 formed in shaft 102. A member generally designated at 104, and having a flange portion 106 and a hub portion 107 with keys 108 formed therein, is slidably and drivingly connected to shaft 102. The outer peripheral portion of one surface of flange 106 forms a frictional driving connection by contacting a stepped ring-like surface on gear 101. Surrounding the hub 107 is a three-pronged spring member 109 which, at the outer end of the prongs, bears against the surface of gear 101. In the hub area, spring 109 is adjusted to give a proper torque driving relationship at the contact surface between flange 106 and gear 101 and is driven and retained in such position by means of a clamp ring 111.

Adjacent to pinion 92, shaft 102 has an annular groove 112 in which a hairpin formation 113 of a spring wire shifting member 114 is snapped. Formed as part of lever 69 are ears 116, 117, 118, and 119 which cooperate with spring shifter member 114 to shift pinion 92 to mesh with either zoom adjustment gear 23 or focus adjustment gear 24. Spring shifting member 114 is mounted in oversize holes in ears 116 and 117 and upon rotational movement of lever 69, shifts pinion 92 from either one of gears 23 and 24 to the other. If, however, there is an interference of teeth of pinion 92 with the teeth of either of gears 23 or 24, the spring shifter 114 will flex until rotational movement of pinion 92 effects a mesh between it and either of gears 23 or 24. Normally, the spring power of the shifter 114 is sufficient to effect complete engagement and disengagement of the pinion 92 with either of gears 23 or 24. However, in the event that there is a sticking condition caused by any foreign material in the gears, movement of shifter plate 69 will, under such circumstances, cause either ear 118 or 119 to abut spring shifter 114 for positive movement dependent upon direction of shift movement.

Figures 5, 7:
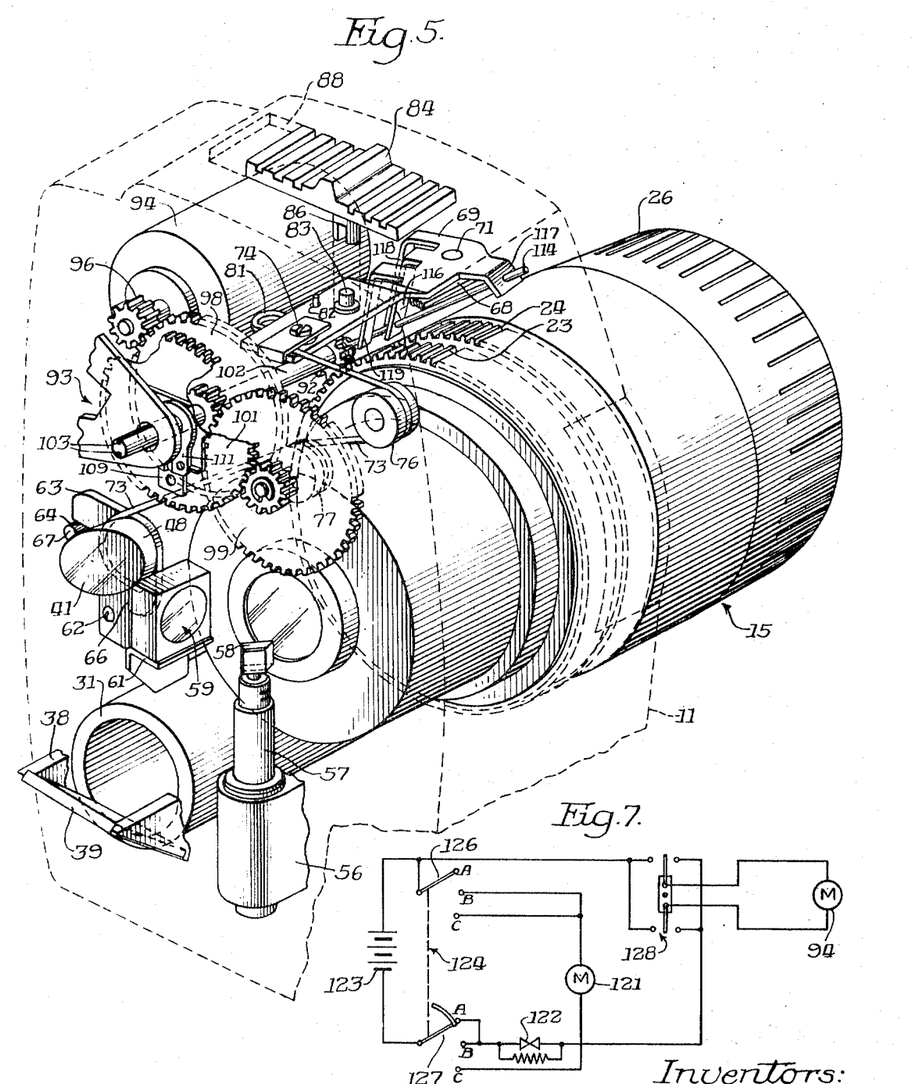
FIG. 5 is a perspective view showing the power drive mechanism and its relationship to the zoom lens.
FIG. 7 is an electrical circuit diagram.
Figure 6:
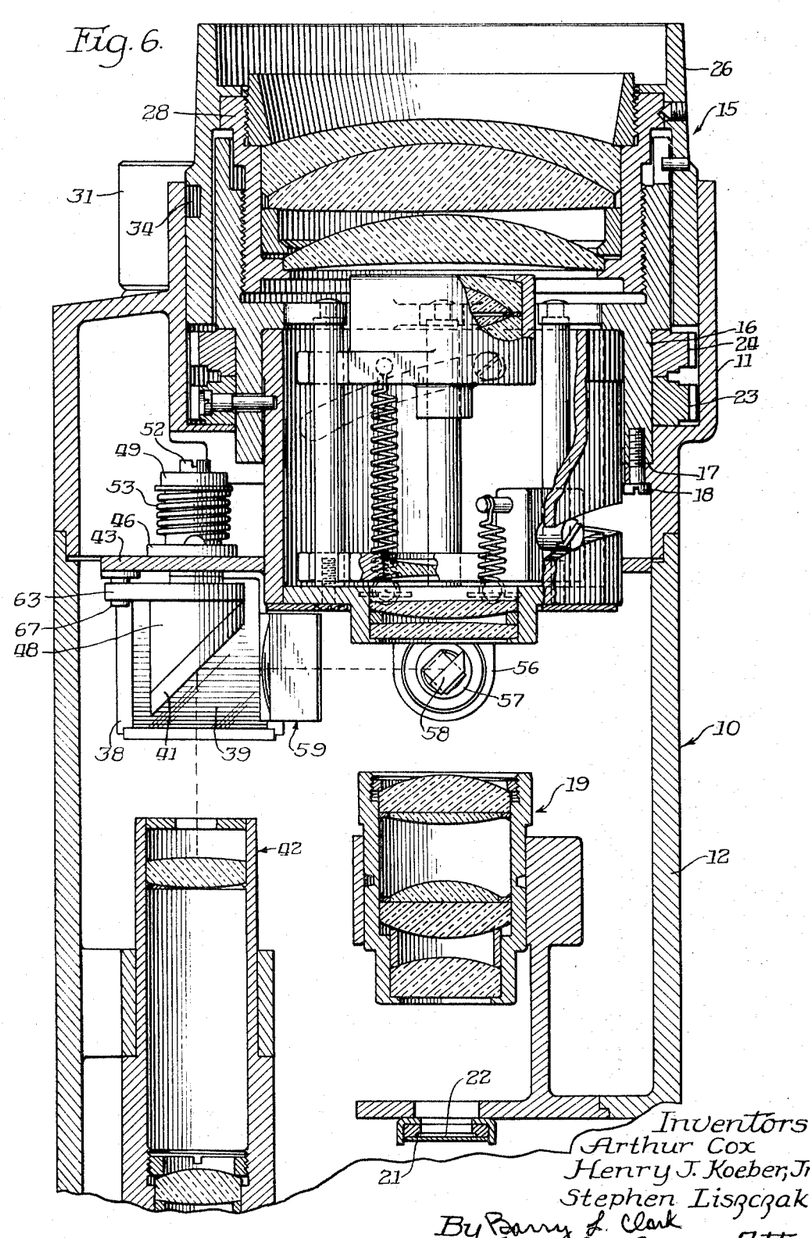
FIG. 6 is a horizontal sectional view taken on the line 6—6 of FIG. 1.

FIG. 7 illustrates the electrical circuitry used in the camera. A motor 121 having a governor 122 is used to drive the film moving mechanism and is mounted within the rear camera housing 12. Motors 121 and 94 are energized from a power source such as a battery 123 which is also mounted within housing 12. A switch generally indicated at 124 has two switch sections 126 and 127 with each of these sections having three contact positions designated as A, B, and C. Switch 124 is normally spring urged toward the A contact position and is operated by the starting button of the camera.

A treadle type reversing switch 128 is used to control motor 94 and is operated by a pair of push buttons extending through the top wall of housing 12. In the position of switch 124 illustrated in FIG. 7, motor 94 through treadle switch 128 can operate in either the forward or reverse direction with the full power potential of battery 123 applied to the motor. At a relatively fast speed, zoom lens 15 can selectively, through sliding control member 84, be either zoomed or focused without operation of the film moving mechanism by motor 121. Since motor 121 is not in operation, its governor 122 is closed and forms part of the electrical path from the battery 123 through switch section 127 to motor 94.

As switch 124 is moved downwardly so that switch sections 126 and 127 are now connected to the B contacts, motor 121 is energized with its speed being regulated by governor 122. In this switch position, motor 94 is not only operable but its speed is also being controlled by governor 122.

When the switch 124 is moved further downwardly so that switch sections 126 and 127 are now connected to the C contacts, both motors 121 and 94 can now operate at a relatively fast speed with the full potential of battery 123 connected to both motors without passing through the governor 122.

A camera embodying this invention has great versatility inasmuch as an operator can selectively zoom or focus the lens for scene composition and sharpness of image prior to actually taking pictures. During picture taking, he has the option of zooming the lens or keeping it sharply focused on a moving object in a follow-focus shot.

Although a specific embodiment of the invention has been shown and described, it is to be understood that many variations in the arrangement can be made. For example, suitable mechanism could be incorporated connecting the camera starting button with sliding control lever 84 to move it to its power zoom position in the event it had been left in its power focus position prior to picture taking. Other changes and modifications may be made therein without departing from the inventive concept underlying the same. Therefore, the invention is not to be limited except insofar as is necessitated by the prior art and the scope of the appended claims.

We claim:

1. Apparatus for use in a motion picture camera having a housing, a zoom main objective through which light rays from the subject to be photographed pass, and a viewfinder means, the improvement comprising:
    a focusing objective in the housing through which similar light rays pass along an optical path substantially parallel to the optical path of the main objective;
    reflecting means in the optical path of both objectives;
    optical means selectively movable to direct said light rays from one of said reflecting means toward the viewfinder means;
    stop means in the housing;
    manually operable control means exterior of said housing operably connected to cause selection of the position of said selectively movable optical means upon movement of said control means between a first and a second position;
    a portion of said movable optical means being adapted to engage said stop means when said control means is in said first position, and another portion of said movable optical means being adapted to engage said stop means when said control means is in said second position;
    whereby said light rays from said objectives may be selectively viewed through said viewfinder means by manually positioning said control means.

2. Apparatus as in claim 1 including means to urge one of said portions on said movable optical means against said stop means when said control means is in said first position wherein when said control means is moved to a second position, said movable means is moved against the urging means to position said other portion against said stop.

3. In a motion picture camera having a housing, viewfinder means in said housing, a zoom main objective and a focusing objective passing rays along substantially parallel optical paths;
    a reflecting means in the optical path of said main objective;
    a reflecting means in the optical path of said focusing objective;
    said reflecting means causing said rays in said optical paths to cross;
    means selectively pivotable at the juncture of said optical paths to direct said rays from one of the said optical paths to said viewfinder means and to block said other rays; and
    means to control the positioning of said pivotable means wherein the optical path to the viewfinder means is manually selected.

4. In a dual speed power focusing and zooming mechanism for a camera including a camera drive mechanism;
    an objective adapted to be zoomed and focused;
    means on said objective to cause said zooming;
    means on said objective to cause said focusing;
    a first motor selectively connectable to actuate said focusing means and said zooming means;
    a second motor selectively connectable to power said camera drive mechanism;
    governor means selectively connectable with said second motor to control the speed of said motor when connected; and
    electric circuitry means connecting said first motor and said governor means wherein the speed of the said motor is controlled by said governor means when said governor means is operatively connected to control the speed of said second motor and wherein said first motor is operative uncontrolled by said governor when said second motor is not controlled by said governor means.

5. In a dual speed power focusing and focal length varying mechanism for a motion picture camera including a camera drive mechanism and an objective;
    at least one element of said objective being adapted to be moved to focus said objective;
    at least another element of said objective being adapted to be moved to vary the focal length of said objective;
    first means operably connected with said first element to effect said focusing of said objective;
    second means operably connected with said second element to effect said focal length variation of said objective;
    a power source in a normally open circuit;
    a first motor in said circuit;
    means to selectively mechanically connect said first motor to power said first means and said second means;
    normally open first switch means operable to connect said first motor in a closed circuit with said power source to power said mechanically connected first or second means;
    a second motor to power the camera drive mechanism when in a closed circuit with said power source;
    governor means adapted to be selectively connected in said circuit to control the rate of operation of said first motor and said second motor when in a closed circuit therewith;
    first normally open circuit means adapted to be connected to said first motor and said power source bypassing said governor means and said second motor to permit independent operation of said first motor;
    second normally open circuit means adapted to be connected to said first motor, said second motor and said power source through said governor means to permit governor control of the rate of operation of said first motor and said second motor;
    third normally open circuit means adapted to be connected to said first motor, said second motor and said power source bypassing said governor means wherein said first motor and said second motor are operated independently of control of said governor means; and
    second switch means operable to selectively close one of said normally open circuit means.

6. In a motion picture camera including a drive mechanism and an objective;
    at least one element of said objective being adapted to be bi-directionally moved to focus said objective;
    at least another element of said objective being adapted to be bi-directionally moved to vary the focal length of said objective;
    first means operably connected with said first element to effect said focusing;
    second means operably connected with said second element to effect said focal length variation;
    a power source in a normally open circuit;
    first motor means in said circuit;
    said motor means being selectively mechanically connectable to power said first means and said second means;
    normally open first switch means operable to connect said first motor means in a closed circuit with said power source to power said mechanically connected first or second means;

second motor means to power the drive mechanism of said camera when in a closed circuit with said power source;

governor means to be selectively connected in said circuit to control the rate of operation of said first motor means and said second motor means when in a closed circuit therewith;

first normally open circuit means adapted to be connected to said first motor means and said power source bypassing said governor means and second motor means;

second normally open circuit means adapted to be connected to said first motor means, said second motor means and said power source through said governor means wherein the rate of operation of both said motor means is controlled by said governor means;

third normally open circuit means adapted to be connected to said first motor means, second motor means and said power source bypassing said governor means wherein the rate of operation of both said motor means is independent of said governor means;

second switch means operable to selectively close one of said normally open circuit means to control the relation of said governor to said first motor means and second motor means;

whereby the rate of operation of said first motor means is made responsive to said governor means only when said second motor means is made responsive to said governor means.

7. In a motion picture camera including a housing and a camera drive mechanism therein:

a focusable, variable focal length main objective in the housing through which light rays from the subject to be photographed pass along an optical path;

at least one element of said objective being bi-directionally movable to focus said objective;

at least a second element of said objective being bi-directionally movable to vary the focal length of said objective;

a focusing objective in the housing through which light rays similar to those through the main objective pass along an optical path substantially parallel to the optical path of said main objective;

a viewfinder means in the housing having an optical path displaced relative to said main objective optical path and said focusing objective optical path;

sleeve means on said main objective operable to move said focusing element;

cam slot means in said sleeve means;

barrel means about said focusing objective operable to focus said focusing objective by movement of same relative to said housing;

cam follower means on said barrel means;

said cam means and said follower means being operably connected wherein when one of said objectives is focused, the other of said objectives is focused;

focusing ring gear means surrounding said main objective and operably connected with said sleeve means;

focal length varying ring gear means surrounding said main objective and spaced from said focusing ring gear means along the optical axis of said main objective;

said focal length varying ring gear means being operably connected to said second element of said main objective to move same;

a reversible motor in said housing;

shaft means operably connected to be driven by said motor;

said shaft means being movable between a first position and a second position;

pinion means fixed to said shaft means to be driven and moved therewith;

said pinion means being positioned to selectively engage one of said ring gear means when said shaft means is in said first position and to engage said other ring gear means when said shaft is in said second position;

a drive motor operably connected to said camera drive mechanism;

governor means selectively connectable in an electrical circuit with said drive motor;

electric circuitry means connecting said reversible motor and said drive motor wherein said motors are controlled by said governor means when said circuitry between said drive motor and said governor means is closed;

other electric circuitry connecting said reversible motor wherein said reversible motor is operated uncontrolled by said governor means when said first electric circuitry is opened;

first fixed reflecting means in said main objective optical path;

second fixed reflecting means in said focusing objective optical path;

third reflecting means selectively positionable in a first position and a second position to reflect the rays from said first reflecting means to said viewfinder means in said first position and to reflect the rays from said second reflecting means to said viewfinder means when in said second position;

stop means in said housing;

means supporting said third reflecting means;

spaced stop engaging portions on said support means wherein one of said stop engaging portions engages said stop means when said reflecting means and support means are in one position and said other stop engaging portion engages said stop means when said reflecting means and support means are in another position;

control means on said housing adapted to be manually moved between a first position and a second position;

said control means being operably connected to said shaft means and said support means for said third reflecting means wherein said first position and said second position of each said means are related;

means to bias said supporting means to engage one of said stop means; and flexible means operably connected between said control means and said support means to permit said control means to move said support means from said one position as urged by said biasing means to said other position against the biasing of said biasing means;

whereby said camera is provided with a dual speed power zooming and focusing mechanism including means to permit selective viewing through a main objective and a focusing objective.

8. In a camera, a focusable variable focal length main objective, first drivable means for adjusting the focus of said main objective, second drivable means for varying the focal length of said main objective, an energizable motor means, shiftable means operatively connected with said motor means and being movable to cause said motor means to alternatively drive either of said drivable means, and a control means for moving said shiftable means to selectively engage either said first or said second drivable means, whereby when said shiftable means is in one position, operation of said motor means adjusts the focus of said objective, and when said shiftable means is in a second position, operation of said motor means varies the focal length of said main objective.

9. A camera as in claim 8 including a main drive motor operable to move film in the camera at at least a first speed and a second speed, a manually operable control member for actuating said drive motor at a selected one of said speeds to transport film, and means including electrical circuitry to control the selected speed of said main drive motor, and means operatively connected with said motor control means to coordinate the speed of said energizable motor whereby the latter motor is operable at a relatively high speed when said main drive motor is not being actuated to transport film, and at a slower speed when said main drive motor is being actuated to transport film at a normal running speed.

10. In a camera,
a focusable variable focal length main objective,
a focusing objective mounted adjacent said main objective,
drivable focusing means on said main objective,
drivable focal length varying means on said main objective,
drivable focusing means on said focusing objective,
said focusing means on said main objective and said focusing means on said focusing objective being operably connected,
drive means selectively positionable to engage one of said focusing means or said means for varying the focal length of said main objective so as to adjust said engaged means when operated, and
power means operably connected to said drive means,
whereby when said drive means is operably connected to focus one of said objectives, both objectives are simultaneously focused.

11. A camera as in claim 10 wherein said focusing objective is of a focal length greater than the maximum focal length to which said main objective can be varied.

12. A camera as in claim 10 including a viewfinder means, a housing, a control means movable between two positions, a first reflecting means located along the axis of said main objective, a second reflecting means located along the optical axis of said focusing objective, and a third reflecting means intersecting the optical axis of said viewfinder means and displaced from both of said objective optical axes and selectively positionable in the path of rays as reflected from said first and second reflecting means wherein said rays are selectively reflected to the viewfinder means in the housing upon positioning of said control means in one of said two positions.

13. In a camera,
a focusable, variable focal length main objective,
an auxiliary focusing objective,
first drivable means for adjusting the focus of said main objective,
second drivable means for adjusting the focus of said auxiliary objective,
cooperating means on said first and second drivable means permitting said first and second drivable means to be driven in synchronism,
third drivable means for varying the focal length of said main objective,
a drive means, and
a control means movable to either of two positions and selectively operable to connect said drive means to either said cooperating means or said third drivable means,
whereby when said control means is in one position, operation of said drive means adjusts the focus of said objective, and when said control means is in a second position, operation of said drive means varies the focal length of said main objective.

14. A camera as in claim 13 wherein said first drivable means includes a first ring operatively connected with at least one element of said objective, and said second drivable means includes a second ring operatively connected with at least one other element of said objective; and said power drive means includes shiftable means adapted to be alternatively positioned in operative engagement with one of said rings.

15. A camera as in claim 14 wherein said rings are ring gears, and said shiftable means is a pinion adapted to mesh with said gears.

16. A camera as in claim 15 wherein said first drivable means includes a sleeve means, and said second drivable means includes a barrel means, said sleeve means and said barrel means including cooperating cam and cam follower means whereby when one of said sleeve means and said barrel means is driven to focus one of said objectives, the other of said objectives is caused to be simultaneously focused.

17. A camera as in claim 13 including:
a viewfinding means,
a housing,
a first reflecting means located along the optical axis of said main objective,
a second reflecting means located along the optical axis of said auxiliary objective, and
a third reflecting means in an optical path with said viewfinding means and displaced from both of said optical axes and selectively positionable in the path of rays as reflected from said first and second reflecting means wherein said rays are selectively reflected to the viewfinder means in the housing.

18. A camera as in claim 17 wherein said third reflecting means is pivotable through approximately 90 degrees.

19. A camera as in claim 17 including: a connecting means provided to operatively connect said third reflecting means and said control means to selectively position said third reflecting means alternatively to reflect light rays from either said first or second reflecting means into said viewfinder means.

20. A camera as in claim 19 wherein a stop member is positioned within said housing and said third reflecting means includes a pair of spaced stop engaging members to accurately position said reflecting means relative to one of said first and second reflecting means wherein the rays reflected by said first or second reflecting means are directed by said third reflecting means through said viewfinder means.

21. Apparatus as in claim 20 including means to bias one of said stop engaging members on said third reflecting means against said stop means when said control means is in said first position, and wherein said stop portion is moved against said biasing means to position said other member against said stop.

22. A camera as in claim 13 wherein said auxiliary objective is of a focal length greater than the maximum focal length to which said main objective can be varied.

23. A camera as in claim 13 including a housing; and wherein a portion of said control means is positioned exterior of said housing whereby the same can be manually moved between said first and second positions.

24. A camera as in claim 13 including:
a main drive motor,
a manually operated control member for actuating said drive motor to transport film, and
electrical circuitry for permitting said drive means to operate at a relatively high speed for focusing or composing when said control member is not being actuated to transport film, and at a slower speed when said control member is being actuated to transport film at a normal running speed.

25. In a motion picture camera including a housing and a camera drive mechanism therein;
a focusable variable focal length main objective in the housing through which rays from the subject to be photographed pass along an optical path;
at least one element of said objective being bi-directionally movable to enable focusing of said objective;

at least a second element of said objective being bi-directionally movable to enable variation of the focal length of said objective;

an auxiliary focusing objective in the housing through which light rays similar to those through the main objective pass along an optical path substantially parallel to the optical path of said main objective;

a viewfinder means in the housing having an optical path displaced relative to said main objective optical path and said auxiliary objective optical path;

first drivable means on said main objective operable to move said focusing element;

second drivable means on said auxiliary objective operable to move said auxiliary objective relative to said housing to focus same;

cooperating means on said first and second drivable means permitting said first and second drivable means to be driven in synchronism;

third drivable means moving said element enabling variation of the focal length of said main objective;

a reversible motor in said housing;

transmission means operatively connected with said motor and being selectively positionable in engagement with either said cooperating means or said third drivable means;

a drive motor operably connected to said camera drive mechanism;

governor means selectively connectable in an electrical circuit with said drive motor;

electric circuitry means connecting said reversible motor in said drive motor wherein both said motors are controlled by said governor means only when said drive motor is controlled by said governor means;

first fixed reflecting means located along the optical path of said main objective;

a second fixed reflecting means located along the optical axis of said auxiliary objective;

a third reflecting means displaced from both of said optical axes and selectively positionable in the path of rays as reflected from said first and second reflecting means wherein said rays are selectively reflected to the viewfinder means; and a manually actuated control means movable between a first position and a second position;

said control means being operatively connected to said transmission means and said third reflecting means wherein said first position and said second position of each said means are related wherein the focal length of said main objective is caused to be varied by said reversible motor and said optical path of said viewfinder means is from said main objective when said control means is in said first position, and wherein said main objective and said auxiliary objective are focused by said reversible motor and said optical path to said viewfinder means is from said viewing objective when said control means is in said second position.

References Cited

UNITED STATES PATENTS

| | | | |
|---|---|---|---|
| 2,732,763 | 1/1956 | Back et al. | 350—186 |
| 2,984,154 | 5/1961 | Walker | 350—186 |
| 3,194,139 | 7/1965 | Babcock | 352—140 X |

FOREIGN PATENTS 228,641    7/1963    Austria.

JULIA E. COINER, *Primary Examiner.*